United States Patent [19]

McMurray, Jr. et al.

[11] Patent Number: 4,925,276

[45] Date of Patent: May 15, 1990

[54] LIQUID CRYSTAL LIGHT VALVE UTILIZING HYDROGENATED AMORPHOUS SILICON PHOTODIODE

[75] Inventors: Robert E. McMurray, Jr., Berkeley; Steven M. Jarrett, Los Altos, both of Calif.

[73] Assignee: Electrohome Limited, Canada

[21] Appl. No.: 45,065

[22] Filed: May 1, 1987

[51] Int. Cl.$^5$ ............................................. G02F 1/13
[52] U.S. Cl. ...................................... 350/342; 350/334
[58] Field of Search ................................. 350/342, 334

[56] References Cited

U.S. PATENT DOCUMENTS

| | | | |
|---|---|---|---|
| 3,824,002 | 7/1974 | Beard | 350/342 |
| 3,976,361 | 8/1976 | Fraas et al. | 350/342 |
| 4,032,954 | 6/1977 | Grinberg et al. | 350/342 |
| 4,191,452 | 3/1980 | Grinberg et al. | 350/342 |
| 4,225,222 | 9/1980 | Kempter | 355/3 D R |
| 4,569,719 | 2/1986 | Coleman | 156/643 |
| 4,597,162 | 7/1986 | Johnson et al. | 350/334 |
| 4,693,561 | 9/1987 | Ashley | 350/342 |

FOREIGN PATENT DOCUMENTS 0081627  5/1984  Japan .................................. 350/342

OTHER PUBLICATIONS

J. D. Joannopoulos, "The Physics of Hydrogenated Amorphous Silicon I", 1984, pp. 103–105.
Hayama, "Amorphous-Silicon Thin-Film Metal-Oxide—Semiconductor Transistors", App. Physics Lett. 36(9), May 1980.
Samuelson, "Fast Photoconductor Coupled Liquid—Crystal Light Valve", Appl. Phys. Lett. 34(7), Apr. 1979.
N. Yamamoto, et al., "Electrophotographic Properties of RF Glow Discharge-Produced Amorphous Si:H Film", Japan J. Appl. Phys., vol. 20 (1981) Supp. 20-1, pp. 305–310.
N. Yamamoto, "Photoelectric Properties of GD a-Si:H Monolayer Films for Electrophotographic Applications", J. Physique 42, C4, 495-98 (1981).
I. Shimizu, et al., "a-Si:H in Electrophotography and Vidicon Devices", J. Physique, 42, C4, 1123-30 (1981).
I. Shimizu, et al., "Studies on Primary Photocurrent of a-Si:H Using Xerographic & Vidicon Techniques", AIP Conf. Proc. No. 73, pp. 288–292 (1981).
I. Shimizu, et al., "A-Si Thin Film as a Photo-Receptor for Electro-Photography", J. Non-Cryst. Solids, 35/36, 773–778 (1980).
L. M. Fraas et al., "AC Photoresponse of a Large-Area Imaging CdS/CdTe Heterojunction", J. Appl. Physics, vol. 47, No. 2, Feb. 1976, pp. 584–590.
Ashley and Davis, "Amorphous Silicon Photoconductor in a Liquid Crystal Spatial Light Modulator", Applied Optics, vol. 26, No. 2, Jan. 15, 1987, pp. 241–246.
L. Samuelson et al., "Fast Photoconductor Coupled Liquid-Crystal Light Valve", Appl. Phys. Lett. 34(7), Apr. 1, 1979, pp. 450–452.

Primary Examiner—Stanley D. Miller
Assistant Examiner—Trong Quang Phan
Attorney, Agent, or Firm—Majestic, Parsons, Siebert & Hsue

[57] ABSTRACT

A liquid crystal light valve is provided which comprises a pair of glass cover plates. Transparent electrodes are located on the interfaces of each cover plate. The electrodes are electrically connected to alternating current sources. Insulating films are placed on either side of a liquid crystal material to provide electrical and chemical isolation between the liquid crystal and the electrodes. Spacers are employed to maintain a suitable gap between the insulating films and to prevent the liquid crystal from escaping. Positioned on the side of the liquid crystal from which writing light enters the light valve are, respectively, a dielectric mirror, a light blocking layer and a photoactive layer. According to the present invention, the photoactive layer comprises hydrogenated amorphous silicon which is configured as a photodiode with a junction layer facing the writing light.

21 Claims, 1 Drawing Sheet

LIQUID CRYSTAL LIGHT VALVE UTILIZING HYDROGENATED AMORPHOUS SILICON PHOTODIODE

BACKGROUND OF THE INVENTION

1. Field of the Invention

The present invention relates to liquid crystal light valves of the type utilized in video projection systems and, in particular, to a reflective liquid crystal light valve which utilizes a hydrogenated amorphous silicon photodiode to activate the liquid crystal in the presence of a photoactivation signal.

2. Discussion of the Prior Art

In the operation of a liquid crystal light valve, the electro-optical properties of a liquid crystal are used to modulate a projection light based upon a photoactivating writing light. For the light valve to function properly, it must be capable of switching a drive voltage from a photoactivated layer to the liquid crystal layer in response to application of the writing light to the photoactived layer.

Liquid crystal light valves based on cadmium sulfide photoconductors are well known. For example, U.S. Pat. No. 3,824,002 entitled "Alternating Current Liquid Crystal Light Valve", issued to Beard on July 6, 1974 teaches a light valve wherein transparent indium-tin-oxide (ITO) electrodes are formed on the interfaces of two glass cover plates. The ITO electrodes are electrically connected to alternating current sources through associated leads. A silicon dioxide insulating film is formed on either side of a nematic liquid crystal to provide electrical and chemical isolation between the liquid crystal and the electrodes. Spacers are utilized to maintain a suitable gap between the insulating layers and to prevent the liquid crystal from escaping. Positioned sequentially on the side of the liquid crystal from which photoactivating writing light enters the light valve are a zinc sulfide dielectric mirror, a light blocking layer of cadmium telluride and the cadmium sulfide photoconductor.

The above-mentioned Beard patent teaches the basic principles of operation of an alternating current reflective liquid crystal light valve, i.e., the photoconductor must be impedance matched to the liquid crystal and the photocapacitance of the photoconductor must be altered in response to the writing light.

U.S. Pat. No. 3,976,361 entitled "Charge Storage Diode With Graded Defect Density Photocapacitive Layer" issued to Fraas et al. on Aug. 24, 1976, teaches the advantages of providing a reflective liquid crystal light valve of the type described in the above-mentioned Beard patent with a high sensitivity photoactive layer comprising a dual-layer cadmium sulfide photodiode wherein the first layer is relatively pure cadmium sulfide and the second layer, which forms the interface with the cadmium telluride light blocking layer, is cadmium sulfide film which has a higher defect center density in the form of selenium atoms.

While cadmium sulfide light valves of the type taught by Beard and Fraas et al. can provide bright, high resolution and high contrast projected images, they suffer from an unacceptable drawback for some applications. This drawback is "persistance", or a latent image in the projection which fades slowly dependant on "charge integration", that is, on the length of time that the writing light is applied to the cadmium sulfide. Persistance is due to the presence of electron traps deep within the 2.4 e.v. wide cadmium sulfide forbidden band.

In addition to the persistence problem described above, cadmium sulfide photoconductors suffer from the further disadvantage that, as a material, cadmium sulfide is difficult to process. Basically, it is difficult to deposit cadmium sulfide on a substrate. Beard describes the thermal deposition of cadmium sulfide on a heated substrate. Typically, this is accomplished by reactive sputter deposition. Cadmium sulfide sputter-deposited under these conditions of thermal stress results in a photoactive layer which has a tendency to peel from the substrate, rendering the light valve inoperative. Even if the cadmium sulfide layer can be successfully deposited, the deposition procedure results in a matte finished surface which then must be polished to permit successful operation of the light valve. Polishing cadmium sulfide to the required finish is known to be a difficult task. Furthermore, there is not a clear understanding either of the physics of cadmium sulfide or of the equivalent circuit of cadmium sulfide based light valves.

U.S. Pat. No. 4,032,954 entitled "Silicon Single Crystal Charge Storage Diode" issued to Grinberg et al. on June 28, 1977 discloses a liquid crystal light valve which utilizes a photoactive layer fabricated from single crystal silicon which is doped with a slow recombination center element, such as silver. The silver-doped single crystal silicon addresses the persistence problem by providing deep hole traps without the slow electron traps common to cadmium sulfide. However, because of the much greater thickness of the single crystal silicon, resolution is severely degraded unless compensating techniques are utilized. For example, Grinberg et al. utilize a photolithographic technique to produce a matrix of small p-n junction pixels formed within the crystalline silicon layer to provide charge localization.

The use of a single crystal silicon photoactive layer rather than cadmium sulfide provides several advantages. Larger area silicon crystals are more readily available than is true for cadmium sulfide. Furthermore, silicon in the single crystal form, as distinguished from the polysilicon form, provides better semiconductor qualities and more consistent quality control then does cadmium sulfide. Single crystal silicon also provides better quality lattice matching and its characteristics and processing are better understood than are those of cadmium sulfide.

While manufacturing techniques for single crystal silicon are better understood than those of cadmium sulfide, the crystalline silicon manufacturing process is still quite complex since a very intrinsic starting material is required for liquid crystal light valve applications. Furthermore, it is difficult to obtain crystalline silicon in large sizes. Also, both the cost of crystalline silicon and the special processing required to tailor it for use as a photoconductive element in a light valve make its use in this application quite expensive. Additionally, the many steps required to process crystalline silicon for use in a light valve greatly reduces yield. In devices of the type described by Gringerg et al, resolution is limited by the number of discrete pixels used.

L. Samuelson et al have reported on the use of amorphous silicon as a dc-coupled photoconductive resistive divider in a reflective liquid crystal light valve. Se "Fast photoconductor coupled liquid-crystal light valve", Appl. Phys. Lett. 34(7), 1 April 1979, pp. 450–452. Samuelson et al describe a light valve comprising a molybdenum electrode which is evaporated onto a glass substrate. A layer of boron-doped amorphous silicon is deposited on the electrode in a glow-discharge apparatus. A 12 micron thick Mylar spacer defines the liquid crystal cavity. A Sn-In-O electrode deposited on a glass substrate completes the device.

The primary focus of Samuelson et al in using amorphous silicon, however, was to develop a "slow" photoconductor, i.e. one which exhibited increased persistence by storing photogenerated charges in deep traps within the photoconductor structure. The Samuelson et al. light valve requires current bleed-off over time after short pulses of addressing laser light have been applied to the amorphous silicon. The amorphous silicon layer acts as a photoresistor with resistance increasing continuously after the light pulse, as the charge is carried through the device in the form of time-decreasing current. This is in marked contrast to devices operating on the entirely different principle of formation and modulation of a depletion layer, which makes use of continuous photogeneration of electron/hole pairs to maintain a given depletion depth and photocapacitance.

SUMMARY OF THE INVENTION

It is a primary object of the present invention to provide a reflective liquid crystal light valve which utilizes a hydrogenated amorphous silicon- photodiode to provide a high resolution projected video image.

It is an object of the present invention to provide a liquid crystal light valve wherein no lateral charge spreading is allowed in the photoactive layer.

It is an object of the present invention to provide a liquid crystal light valve which utilizes CRT writing light to address a hydrogenated amorphous silicon photodiode to produce a high resolution image at TV frame rates.

These and other objects of the invention are accomplished by providing a reflective liquid crystal light valve which utilizes a hydrogenated amorphous silicon layer configured as a photodiode with a very shallow junction layer facing the writing light.

More specifically, the liquid crystal light valve of the present invention comprises a pair of glass cover plates. A transparent electrode is located on the interior surface of each cover plate. The electrodes are electrically connected to alternating current sources. Insulating films are formed on either side of a liquid crystal material to provide electrical and chemical isolation between the liquid crystal and the electrodes and to provide high tilt angle liquid crystal alignment. Spacers are employed to maintain a suitable gap between the insulating films and to prevent the liquid crystal from escaping. Positioned on the side of the liquid crystal from which writing light enters the light valve are, respectively, a dielectric mirror, a light blocking layer and the hydrogenated amorphous silicon layer.

Utilizing a hydrogenated amorphous silicon photodiode provides several advantages over cadmium sulfide photoconductors. First, amorphous silicon is very inexpensive. Second, it is commercially available through several well understood manufacturing processes. Third, it is available in large area sizes. Fourth, it provides contrast ratios and resolution comparable to that of cadmium sulfide photoconductors.

Other objects, feature and advantages of the present invention will become apparent and be appreciated by reference to the detailed description provided below considered in conjunction with the accompanying drawing.

DETAILED DESCRIPTION OF THE INVENTION

Figure 1:
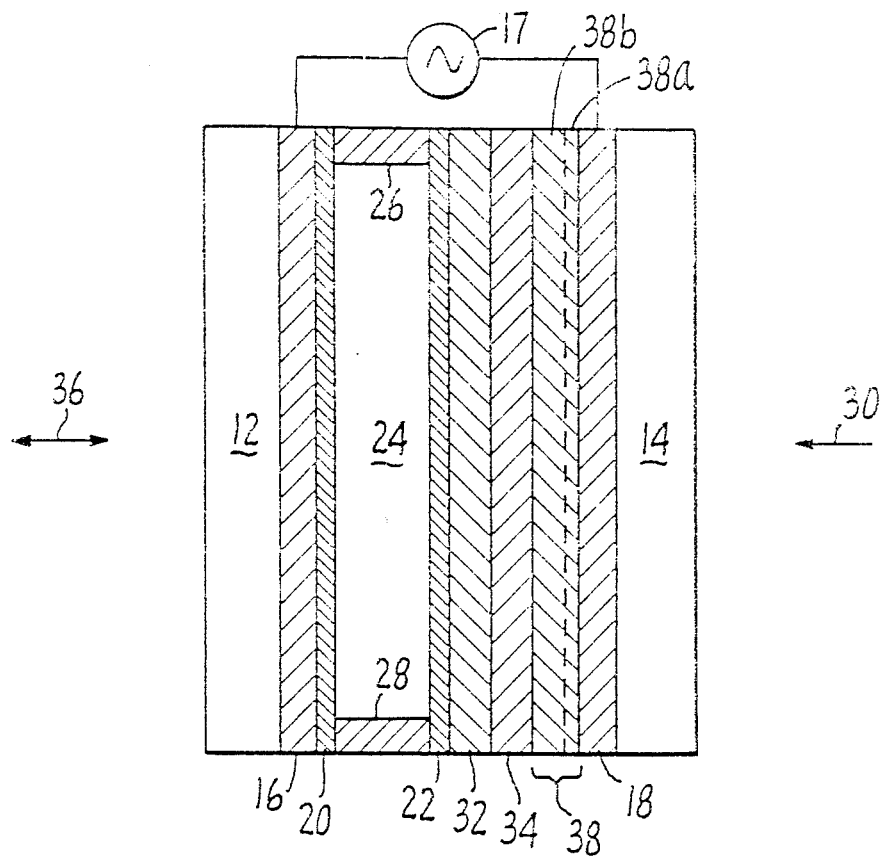
FIG. 1 is a cross-sectional view schematically illustrating a liquid crystal light valve in accordance with the present invention.

FIG. 1 shows a reflective liquid crystal light valve 10 in accordance with the present invention. The basic structural support of the light valve is provided by transparent substrate plates 12 and 14 which are preferably made of ¼" thick Hoya Na-40 glass or equivalent. Transparent electrodes 16 and 18 are formed on the interior faces of substrate plates 12 and 14, respectively. Electrodes 16 and 18 are connected to a source of alternating current 17 in a well known manner. Electrodes 16 and 18 may be commercially-available indium-tin-oxide (ITO) having a thickness of about 300–1200 Angstroms. Insulating films 20 and 22 are formed on either side of a liquid crystal layer 24 to provide both electrical and chemical isolation and a high tilt angle liquid crystal alignment between the liquid crystal and the two electrodes 16 and 18. The liquid crystal in the preferred embodiment is British Drug House E-7 or equivalent having a thickness of about 5 microns. Spacers 26 and 28 are employed to maintain a suitable gap between insulating films 20 and 22 and to prevent the liquid crystal material from escaping or being contaminated. A dielectric mirror 32 is positioned on the side of the liquid crystal layer 24 from which writing light 30 enters the light valve. The dielectric mirror 32 is backed by a light blocking layer 34 comprising, for example, cadmium telluride film. The dielectric mirror 32 is made from alternating layers of transparent materials of high and low optical index of refraction; in the preferred embodiment, these alternating layers comprise silicon dioxide and titanium dioxide. The light blocking film 34 blocks any residual projection light 36 which might otherwise leak through the dielectric mirror 32. In the preferred embodiment, the light blocking layer 34 is cadmium telluride film approximately 3.5 microns thick. However, the light blocking layer could be formed from other materials such as, for example, amorphous silicon.

In accordance with the present invention, the photodiode layer 38 comprises hydrogenated amorphous silicon which is configured as a-photodiode with a very shallow junction layer 38a facing the writing light 30. The heavily doped p+ junction layer 38a forms a p-n junction at the interface with the n-type ITO electrode 18. Placing the p-n junction at the input side of the light valve 10 enables collection of the photo-generated charge near the surface of the silicon 38 without recombination loss.

In the preferred embodiment, the hydrogenated amorphous silicon layer 38 is about 5 microns thick and has a defect density of about $2 \times 10^{15} cm^{-3}$. The starting material is undoped or lightly doped (about 20 ppm boron) hydrogenated amorphous silicon. Material of this type is commercially available from, for example, Plasma Kinetics Inc. of New York.

The p+ junction layer 38a should be less than 1000, and preferably less than 100 Angstroms thick. Using a hydrogenated amorphous silicon layer 38 which is 5 microns thick, a junction layer 38a approximately 50–60 Angstroms thick has been found to provide the best results.

The doping concentration of the p+ junction layer 38a should be in the range of 200–10,000 ppm. In the preferred embodiment, the junction layer 38a is doped to a concentration of about 1000 ppm using boron.

Figure 2:
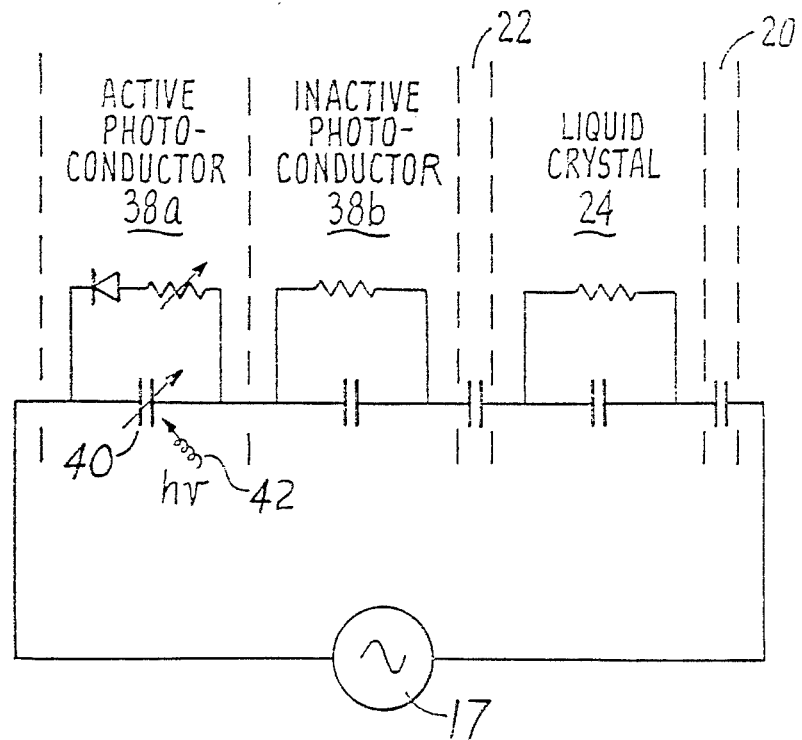
FIG. 2 is a schematic diagram illustrating an equivalent circuit of the liquid crystal light valve shown in FIG. 1.

An equivalent circuit of the light valve of FIG. 1 is illustrated in FIG. 2. The active photoconductive junction layer 38a includes an equivalent capacitance 40 having a value proportional to the amount of light 42 that strikes it. The impedance of the liquid crystal layer 24 is fixed. Thus, as a result of the layer 38a being electrically in series with the liquid crystal 24, a variation of the capacitance 40 in response to a variation in the amount of light 42 incident upon it will cause a corresponding change in the voltage across the liquid crystal layer 24.

It should be understood that various alternatives to the embodiment shown herein may be employed in practicing the present invention. It is intended that the following claims define the invention and that structures within the scope of these claims and their equivalents be covered thereby.

What is claimed is:

1. An ac-coupled liquid crystal light valve comprising:
    a. a first transparent substrate plate having an interior surface;
    b. a first transparent conductive electrode formed adjacent the interior surface of the first transparent substrate plate;
    c. a first transparent insulating layer formed adjacent the first transparent electrode;
    d. A nematic liquid crystal layer disposed between the first transparent insulating layer and a second transparent insulating layer;
    e. a dielectric mirror positioned adjacent the second transparent insulating layer;
    f. a light blocking layer formed adjacent the dielectric mirror;
    g. a hydrogenated amorphous silicon layer formed between the light blocking layer and an interior surface of a second transparent conductive electrode, wherein the hydrogenated amorphous silicon layer is configured as a photodiode having a junction layer of one semi-conductive type at the interface with the second electrode of an opposite semi-conductive type and with a capacitance that varies in response to the level of light incident thereupon in order to change the resulting voltage across the liquid crystal layer;
    h. a second transparent substrate plate having an interior surface adjacent the second electrode; and
    i. a source of alternating current electrically connected between said first and second electrodes.

2. An ac-coupled liquid crystal light valve as in claim 1 wherein the junction layer is less than 1000 Angstroms thick.

3. An ac-coupled liquid crystal light valve comprising:
    a. a first transparent substrate plate having an interior surface;
    b. a first transparent conductive electrode formed adjacent the interior surface of the first substrate plate;
    c. a first transparent insulating layer formed adjacent the first electrode;
    d. an aligned nematic liquid crystal layer disposed between the first insulating layer and a second transparent insulating layer;
    e. a dielectric mirror positioned adjacent the second insulating layer;
    f. a light blocking layer positioned adjacent the dielectric mirror; and
    g. a hydrogenated amorphous silicon layer formed between the light blocking layer and an interior surface of a second transparent conductive electrode of n-type conductivity, wherein the hydrogenated amorphous silicon layer is configured as a photodiode having a junction layer of p-type conductivity at the interface with the n-type second electrode, said junction layer including a p-type dopant in a concentration substantially within the range of from 200 to 10,000 ppm; and
    h. a second transparent substrate plate having an interior surface adjacent the second electrode.

4. An ac-coupled liquid crystal light valve as in claim 3 wherein the hydrogenated amorphous silicon layer is about 5 microns thick.

5. An ac-coupled liquid crystal light valve as in claim 3 wherein the junction layer is less than 1000 Angstroms thick.

6. An ac-coupled liquid crystal light valve as in claim 3 wherein the junction layer is less than 100 Angstroms thick.

7. An ac-coupled liquid crystal light valve as in claim 3 wherein the junction layer is about 50–60 Angstroms thick.

8. An ac-coupled liquid crystal light valve as in claim 1 wherein the junction layer is doped with p-type dopant to a concentration of about 200–10,000 ppm.

9. An ac-coupled liquid crystal light valve as in claim 3 wherein the junction layer is doped with boron to a concentration of about 1000 ppm.

10. An ac-coupled liquid crystal light valve as in claim 3 wherein the light-blocking layer is amorphous silicon.

11. In a light valve device having a layer of liquid crystal held internally in a sandwich structure of a plurality of layers and adapted to receive on one side thereof a light image and to receive on another side thereof projection light that is reflected therefrom with said image of amplified brightness, others of said layers including a first transparent electrode adjacent said one light valve side, a photoconductive layer next to and in contact with said first electrode, a light blocking layer between the photoconductive layer and the liquid crystal layer, and a second transparent electrode adjacent said another light valve side, wherein said device has an equivalent electrical impedance between said first and second electrodes that is primarily capacitive across said liquid crystal layer and in series with that of other of said layers, the improvement wherein said photoconductive layer forms a p-n junction diode with said first electrode and is characterized by an equivalent impedance that includes a capacitance that varies an amount proportional to the brightness of said light image incident thereon such that a voltage drop across the liquid crystal layer from an impressed a.c. voltage across said first and second electrodes varies significantly as a result of such photoconductor junction capacitance variation.

12. The light valve device according to claim 11 wherein the diode is formed by n-type doping in at least a layer of the first electrode that is immediately adjacent the photoconductor layer, and p-type doping in at least a layer of said photoconductor layer adjacent the first conductive layer.

13. The light valve device according to claim 11 wherein said photoconductor layer includes amorphous silicon having a surface layer thereof immediately adjacent the first electrode containing p-type dopant, and wherein said first electrode contains n-type dopant, thereby to form said diode at the interface between the adjacent p-type and n-type dopant layers.

14. The light valve device according to claim 13 wherein said amorphous silicon surface layer contains p-type dopant in a concentration of about 200 to 10,000 ppm., and the remaining thickness of said amorphous silicon layer contains p-type dopant in a concentration of significantly less than 200 ppm.

15. The light valve device according to claim 14 wherein said amorphous silicon surface layer is less than 1000 Angstroms thick.

16. The light valve device according to claim 15 wherein said amorphous silicon layer is about five microns thick.

17. In a light valve device having a layer of liquid crystal held internally in a sandwich structure of a plurality of layers and adapted to receive on one side thereof a light image and to receive on another side thereof projection light that is reflected therefrom with said image of amplified brightness, others of said layers including a first transparent electrode adjacent said one light valve side, a photoconductive layer next to and in contact with said first electrode, a light blocking layer between the photoconductive layer and the liquid crystal layer, and a second transparent layer adjacent said another light valve side, the improvement wherein said photoconductor includes a layer of hydrogenated amorphous silicon that is significantly more heavily doped with p-type dopant in a junction layer thereof immediately against said first electrode than in the remaining thickness of said amorphous silicon layer, thereby to form a p-n junction photodiode between the photoconductor and the first electrode.

18. The light valve device according to claim 17 wherein said junction layer is doped with p-type dopant to a concentration of about 200–10,000 ppm. and the remaining thickness of said silicon layer contains p-type dopant of significantly less than 200 ppm.

19. The light valve device according to claim 18 wherein said junction layer is doped with boron to a concentration of about 1000 ppm.

20. The light valve device according to claim 17 wherein the junction layer is less than 1000 Angstroms thick.

21. The light valve device according to claim 20 wherein the amorphous silicon layer is about 5 microns thick.

* * * * *

UNITED STATES PATENT AND TRADEMARK OFFICE
CERTIFICATE OF CORRECTION

PATENT NO. : 4,925,276

DATED : MAY 15, 1990

INVENTOR(S) : ROBERT E. MCMURRAY, JR. ET AL

It is certified that error appears in the above-identified patent and that said Letters Patent is hereby corrected as shown below:

Column 8, line 17, in Claim 18: insert the word --amorphous-- before the word silicon Signed and Sealed this Eighteenth Day of September, 1990

Attest:

HARRY F. MANBECK, JR.

Attesting Officer

Commissioner of Patents and Trademarks